(12) United States Patent
Ochiai et al.

(10) Patent No.: US 7,578,518 B2
(45) Date of Patent: Aug. 25, 2009

(54) OCCUPANT PROTECTION DEVICE

(75) Inventors: Fumiharu Ochiai, Nasushiobara (JP); Fumitoshi Yasuhara, Utsunomiya (JP); Tohru Kawamura, Yaita (JP); Yusuke Nishida, Moka (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 11/560,070

(22) Filed: Nov. 15, 2006

(65) Prior Publication Data

US 2007/0108746 A1    May 17, 2007

(30) Foreign Application Priority Data

Nov. 17, 2005  (JP)  ............................. 2005-332575
Dec. 6, 2005    (JP)  ............................. 2005-351779

(51) Int. Cl.
    *B60R 21/16*  (2006.01)
(52) U.S. Cl. .................................................. 280/730.2
(58) Field of Classification Search ............. 280/730.2, 280/728.2
    See application file for complete search history.

(56) References Cited

U.S. PATENT DOCUMENTS

| | | | | |
|---|---|---|---|---|
| 5,316,336 A | * | 5/1994 | Taguchi et al. ........... | 280/730.2 |
| 5,647,609 A | * | 7/1997 | Spencer et al. ........... | 280/730.2 |
| 5,718,449 A | * | 2/1998 | Numazawa et al. ...... | 280/730.2 |
| 5,722,685 A | * | 3/1998 | Eyrainer .................. | 280/730.2 |
| 5,957,493 A | * | 9/1999 | Larsen et al. ............. | 280/743.1 |
| 6,073,959 A | * | 6/2000 | Heinz et al. .................. | 280/729 |
| 6,325,410 B1 | * | 12/2001 | Eyrainer .................. | 280/730.2 |
| 6,371,514 B1 | * | 4/2002 | Bombard .................. | 280/730.2 |
| 6,398,254 B2 | * | 6/2002 | David et al. .............. | 280/730.2 |
| 6,508,486 B1 | * | 1/2003 | Welch et al. .............. | 280/730.2 |
| 2005/0057024 A1 | * | 3/2005 | Weston et al. ............. | 280/730.2 |

FOREIGN PATENT DOCUMENTS

JP    2005-088884    4/2005

* cited by examiner

*Primary Examiner*—Faye M. Fleming
(74) *Attorney, Agent, or Firm*—Rankin, Hill & Clark LLP (57) ABSTRACT

An occupant protection device that is provided in a door on the side of a vehicle, including an inflator that has an end portion at which a fluid delivery port is formed and delivers a fluid during a vehicle collision, and an expanding body that expands by the fluid fed by the inflator to cover the inside surface of a window provided in the door, with the end portion of the inflator being directly inserted in the expanding body, and the inflator being provided on the side of the door to be mounted to the vehicle body in the longitudinal direction of the vehicle.

5 Claims, 11 Drawing Sheets

OCCUPANT PROTECTION DEVICE

BACKGROUND OF THE INVENTION

1. Field of the Invention

The present invention relates to an occupant protection device that is provided in a vehicle door and inflates an expanding body along the inside surface of a window.

Priority is claimed on Japanese Patent Application No. 2005-332575, filed Nov. 17, 2005, and Japanese Patent Application No. 2005-351779, filed Dec. 6, 2005, the content of which is incorporated herein by reference.

2. Description of Related Art

As an occupant protection device that is provided in a door of a vehicle, there is known a door-mounted occupant protection device that deploys an expanding body that is provided between an inner panel of the door and a lining that covers the cabin interior side thereof. Among this type of occupant protection device, in order to shorten the overall length, one has a structure in which the end portion of the inflator where a fluid delivery port is formed is directly inserted in the expanding body, with the inflator being disposed directly beneath the expanding body in an overlapping manner (for example, refer to Japanese Unexamined Patent Application, First Publication No. 2005-88884).

The expanding body in an occupant protection device is disposed so as to be able to cover the necessary area for protecting an occupant during a vehicle collision. Therefore, in the case of adopting a structure in which the inflator is disposed directly beneath the expanding body as described above, there is a possibility that the inflator located directly under the expanding body may overlap the position of the occupant. The inflator generally has a rigid housing. Therefore, in the case of a structure that disposes the inflator directly beneath the expanding body as described above, it is necessary to provide an impact absorption structure in order to protect the occupant from the inflator in the event of a vehicle collision.

Moreover, since the impact absorption margin (stroke) decreases by an amount corresponding to the inflator, a high-efficiency impact-absorbing configuration becomes necessary, thereby leading to complication of the structure.

Also, adopting a structure in which the inflator is disposed directly beneath the expanding body as described above leads to the inflator being disposed at a position away from the portion where the door is attached to the vehicle body. As a result, a relatively large input force may occur at the inflator during opening and closing of the door.

Furthermore, in a door-mounted air bag device as disclosed in JP 2005-88884 A described above, due to on-vehicle layout considerations, the inflator that feeds the fluid for expansion to the expanding body may be disposed on the side of the expanding body that expands during a vehicle collision.

In the case of a structure that disposes the inflator on a side of the expanding body, deformation of a mounted member on the vehicle body side to which the air bag device is mounted during a collision may cause relative rotation of the expanding body and the inflator. This may result in damage to the member and the like that couples the expanding body and the inflator. For example, there are numerous cases of side impacts with utility poles and trees that are long in the vertical direction. During such impacts, the occurrence of local deformation in the mounted member increases the likelihood of the relative rotation described above.

Accordingly, a first object of the present invention is to provide an occupant protection device that can simplify the structure and minimize the input force to the inflator during opening and closing of the door.

Also, a second object of the present invention is to provide an air bag device having a structure that disposes the inflator on the side of the expanding body and being capable of suppressing damage during a vehicle collision with an air bag device.

SUMMARY OF THE INVENTION

The occupant protection device according to the present invention is an occupant protection device that is provided in a door on a side of a vehicle, including an inflator that has an end portion at which a fluid delivery port is formed and delivers a fluid during a vehicle collision, and an expanding body that expands by the fluid fed by the inflator to cover an inside surface of a window provided in the door, with the end portion of the inflator being directly inserted in the expanding body, and the inflator being provided on a side of the door to be mounted to a vehicle body in a longitudinal direction of the vehicle.

Since the inflator is thus provided on the side of mounting the door to the vehicle body, it is possible to shift the position of the inflator with respect to the occupant. As a result, the need to cover the inflator with a high-efficiency impact-absorbing structure is eliminated, thereby enabling a simplification of the structure. Also, since the end portion of the inflator at which the fluid delivery port is formed is directly inserted in the expanding body, it is possible to directly feed the fluid from the inflator to the expanding portion during a vehicle collision. As a result, outgassing of the fluid can be prevented. Moreover, since the inflator is provided on the side where the door is mounted to the vehicle body, the input force to the inflator by opening and closing of the door can be minimized.

Also, the inflator may be constituted so as to be provided between an upper portion and a middle portion of the door in a vertical direction.

Providing the inflator between the upper portion and the middle portion of the door, that is, outside the lower portion, can minimize the effects acting on the inflator during a side impact by another vehicle.

Also, the inflator may be constituted so that a portion thereof vertically overlaps the expanding body.

Disposing the inflator to partially overlap the expanding body in the vertical direction can increase storability by making the overall size compact.

Also, the inflator may be constituted to be disposed in a side area of the expanding body and mounted on a mounted member provided on the door so as to be rotatable about an axis that extends in the vertical direction.

According to this constitution, the inflator is mounted on a mounted member on the vehicle body side so as to be rotatable about an axis that follows the vertical direction. For this reason, even when the mounted member deforms during a vehicle collision to cause an input force to the inflator that can generate relative rotation with the expanding body via the mounted member, since the inflator rotates about an axis that follows the vertical direction with respect to the mounted member, relative rotation with respect to the expanding body can be controlled. Accordingly, it is possible to suppress damage during a vehicle collision even with an air bag device in which the inflator is disposed to the side of the expanding body.

Moreover, the inflator may be constituted to be mounted on the mounted member by mounting members that restrict movement of the inflator in the vertical direction with respect to the mounted member.

According to such a constitution, the mounting members for mounting the inflator on the mounted member restrict movement of the inflator in the vertical direction with respect to the mounted member. There is therefore no need to separately provide a vertical movement restriction member, enabling simplification of the structure and a reduction in costs.

DETAILED DESCRIPTION OF THE INVENTION

Embodiments of the occupant protection device according to the present invention shall be described below, with reference to the attached drawings.

FIRST EMBODIMENT

A first embodiment of the occupant protection device according to the present invention shall be described below with reference to FIGS. 1 to 9.

Figure 1:
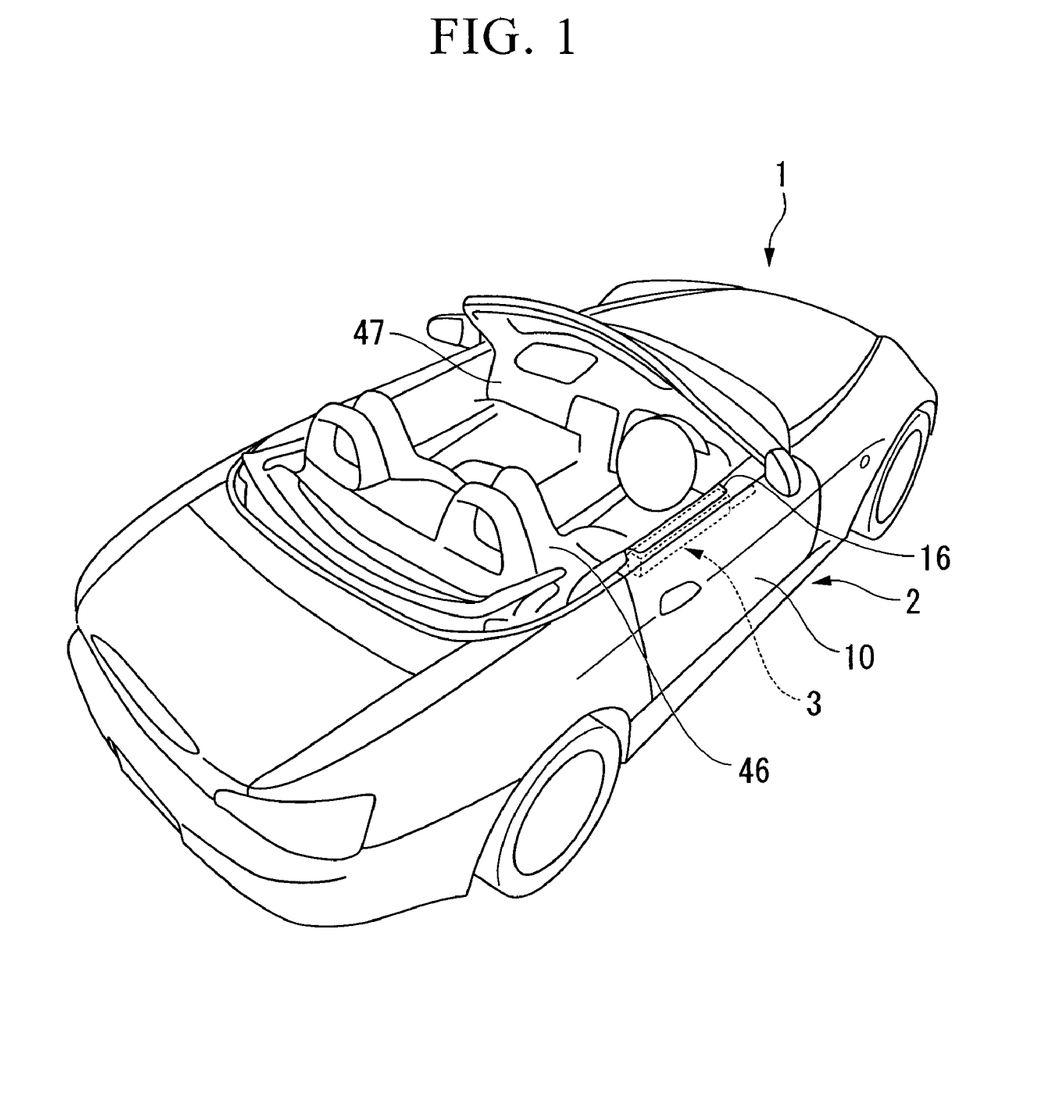
FIG. 1 is a perspective view from the rear of a vehicle to which an air bag device serving as an occupant protection device according to the first embodiment of the present invention has been applied.

FIG. 1 shows a four-wheeled vehicle 1. The vehicle 1 is an open-roof type in which the roof is openable or detachable. An air bag device 3 is disposed as the occupant protection device of the present embodiment in a door 10 provided on the side portion of a vehicle body 2 in the vehicle 1.

Figure 2:
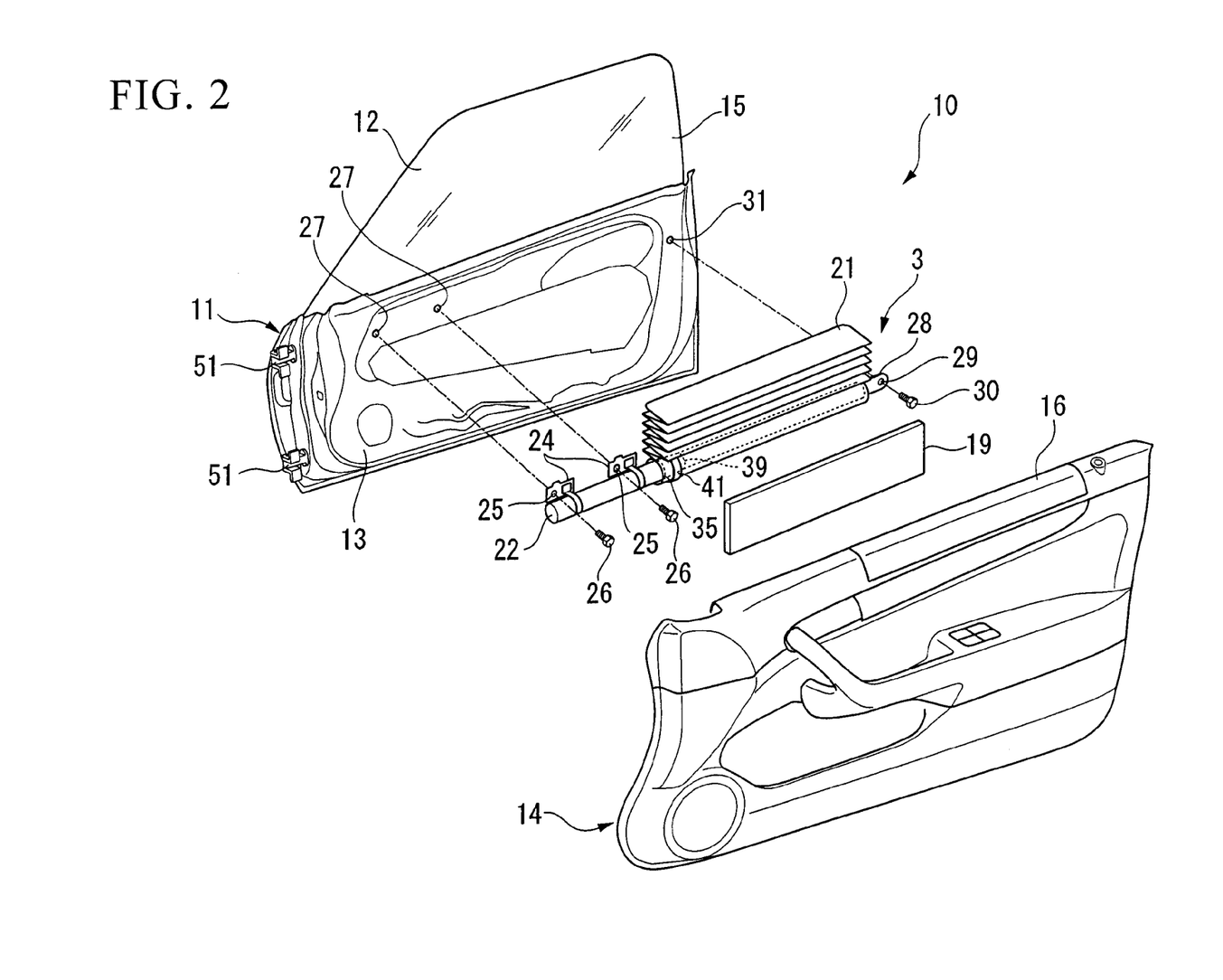
FIG. 2 is an exploded perspective view of a door to which an air bag device serving as an occupant protection device according to the first embodiment of the present invention has been applied.
Figure 3:
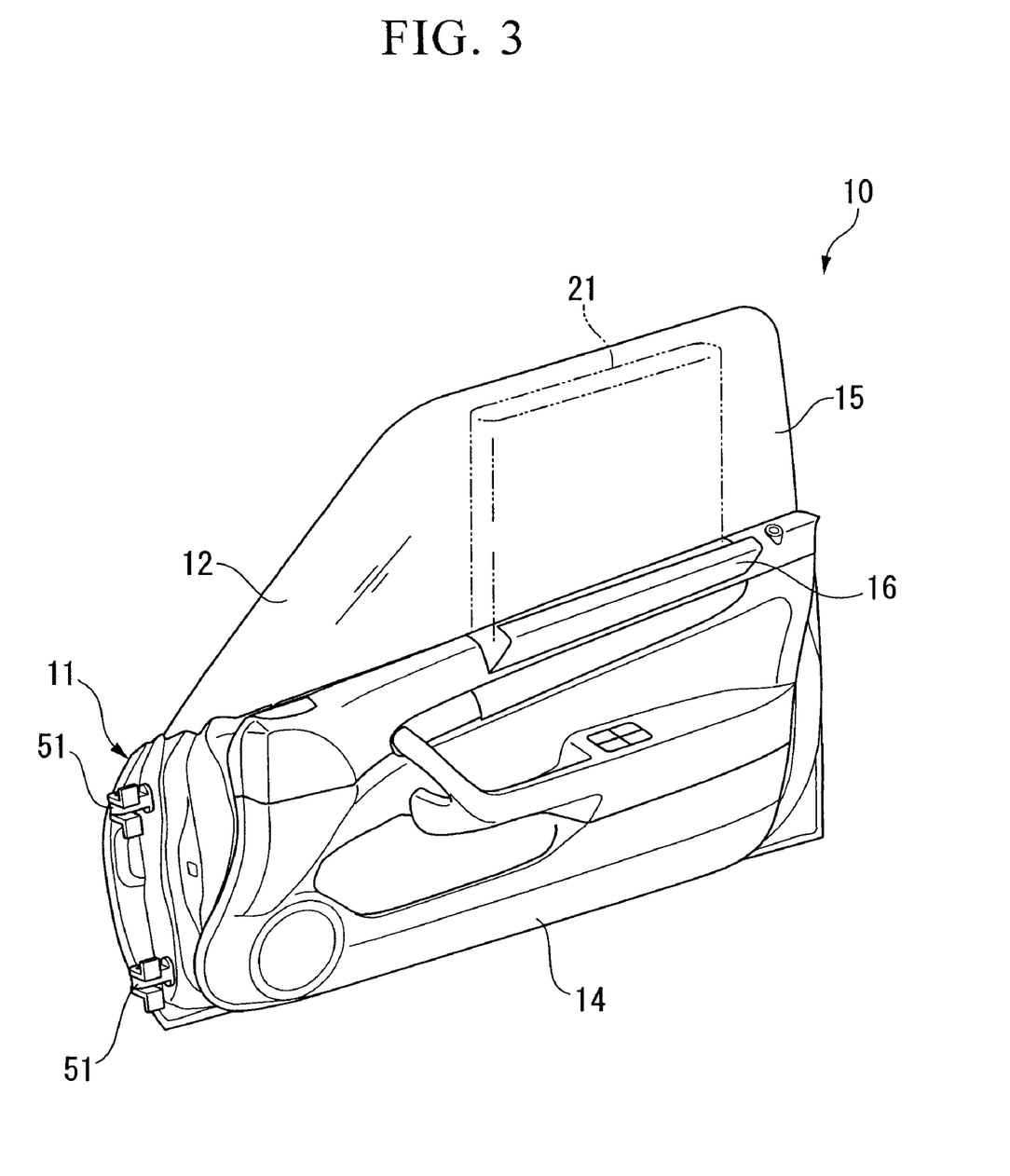
FIG. 3 is a perspective view of a door to which an air bag device serving as an occupant protection device according to the first embodiment of the present invention has been applied.

FIG. 2 is specifically an exploded perspective view of the door 10 on the right side of the vehicle, while FIG. 3 is an assembly drawing of the same. Note that in the description given below, the door 10 is in a closed state.

The door 10 has a metal door body 11, a window glass 12 that can move up and down, and a door lining 14. The door body 11 is disposed perpendicular to the vehicle width direction. The window glass 12 extends upward along the door body 11 from within the door body 11. The door lining 14 covers the cabin interior side of an inner panel 13 that constitutes the cabin interior side of the door body 11, thus forming a design surface of the cabin interior side. The upper side of the door body 11 serves as a window 15. The window 15 is opened and closed by raising and lowering the window glass 12 that constitutes a portion thereof. The metal door body 11 is a high rigidity portion of the door 10.

An opening portion 16 is formed in a predetermined range on the upper edge portion of the door lining 14. The opening portion 16 has a long rectangular shape in the longitudinal direction of the vehicle and opens by swinging on lower edge portion thereof. The air bag device 3, which is the occupant protection device according to the present embodiment, is disposed between this opening portion and the door body 11. A reaction plate 19 that is an impact absorption member is provided on the cabin exterior side of the opening 16 so as to cover the cabin interior side of the lower portion of the air bag device 3.

The air bag device 3 has an air bag body (expanding body) 21 and an inflator 22. The air bag body 21 is disposed on the cabin exterior side of the opening portion 16. The inflator 22 has a cylindrical shape and extends forward in the longitudinal direction of the vehicle from the lower portion of the air bag body 21. The air bag device 3 is fixed to the inner panel 13. Specifically, bolts 26 are inserted through insertion holes 25 of two mounting members 24 that are attached at two locations in a front and rear configuration to the inflator 22, and by screwing the bolts 26 into mounting holes 27 in the inner panel 13, the inflator 22 is fixed to the inner panel 13. A bolt 30 is inserted into an insertion hole 29 of an attachment piece 28 that is provided at the lower portion of the air bag body 21 on the opposite side of the inflator 22. By screwing this bolt 30 into a mounting hole 31 of the inner panel 13, the lower portion of the air bag body 21 is fixed to the inner panel 13. By being thus attached to the inner panel 13, the air bag device 3 has an orientation along the longitudinal direction of the vehicle.

Figure 4:
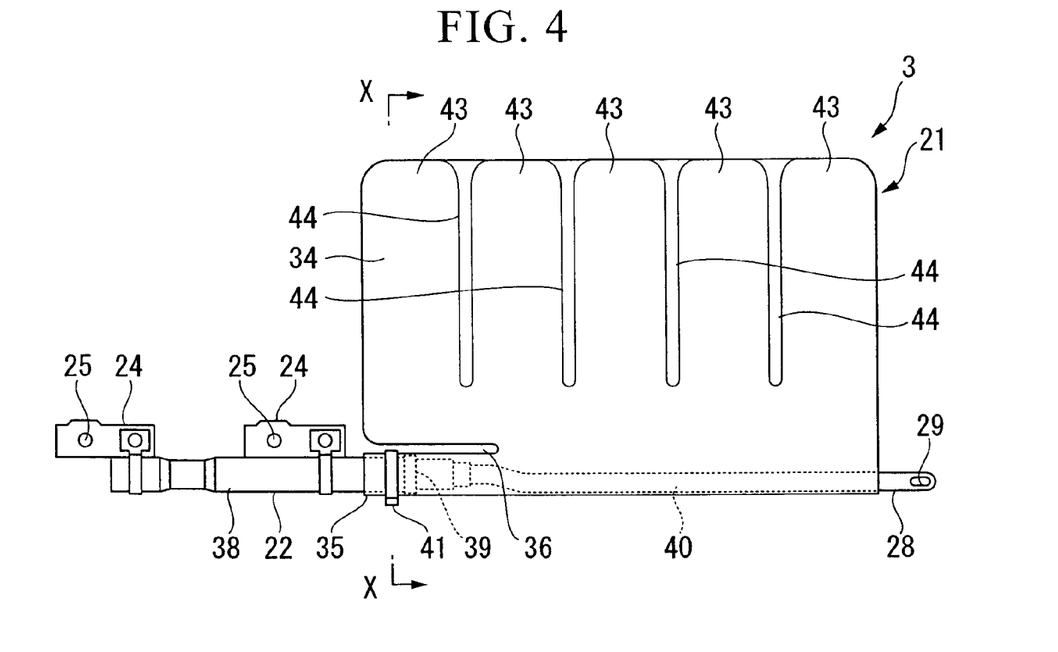
FIG. 4 is a side view of an air bag device serving as an occupant protection device according to the first embodiment of the present invention.
Figure 5:
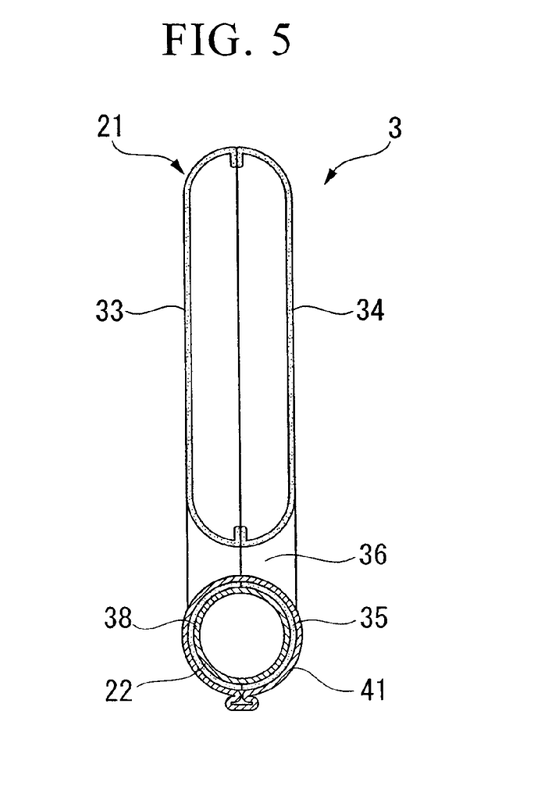
FIG. 5 is a sectional view along line X-X in FIG. 4.

The air bag body 21 is made of fabric and during a vehicle collision expands by high-pressure gas (fluid) fed by the inflator 22 to cover the inside surface of the window 15 provided in the door 10. The air bag body 21, as shown in FIG. 4 and FIG. 5, is formed by a base fabric 33 on the cabin interior side and a base fabric 34 on the cabin exterior side being formed into a sack shape by being sewn together at their peripheral edges. This air bag body 21 has overall a long rectangular shape in the vehicle longitudinal direction, with a cylindrical mounting opening portion 35 that opens to the front being formed at the front end portion of the lower end portion in the longitudinal direction of the vehicle. That is, a cut-in portion 36 is formed within a predetermined range of the front portion (the front portion in the longitudinal direction of the vehicle) of the base fabric 33 and the base fabric 34 at a predetermined distance above the lower end edge. The base fabric 33 and the base fabric 34 that form this cut-in portion 36 are sewn together in a U-shape. Also, by sewing together the peripheral edges of the base fabric 33 and the base fabric 34 other than the mounting opening portion 35, the closed air bag body 21 is formed in which the portion other than at the opening of the cylindrical mounting opening portion 35 is closed in a sack shape.

The inflator 22 has a long housing 38 that is long and cylindrical with a bottom and with the outer portion thereof made of a rigid body such as metal. A propellant that generates high pressure gas by combustion is filled in this housing 38. A gas delivery port (fluid delivery portion) 39 that delivers the high-pressure gas generated by the propellant to the outside is formed in the inflator 22 at the end portion on the opening side of the housing 38. A guide pipe 40 that guides the gas is coupled to this gas delivery port 39. In this inflator 22 in which the guide pipe 40 is thus coupled, the guide pipe 40 is inserted as a whole in the air bag body 21 from the mounting opening portion 35. Moreover, by applying a caulking band (clamp band) 41 that is provided so as to surround the circumference of the mounting opening portion 35 in the state of a portion of the gas delivery port 39 side of the housing 38 being inserted in the mounting opening portion 35, the inflator 22 is directly attached to the air bag body 21. In this state, the portion of the gas delivery port 39 side of the housing 38 of the inflator 22 is wrapped in the longitudinal direction of the vehicle with respect to the air bag body 21. That is, the end portion of the inflator 22 at which the gas delivery port 39 is formed is directly inserted in the air bag body 21 and, moreover, the inflator 22 partially overlaps the air bag body 21 in the vertical direction.

Figure 6:
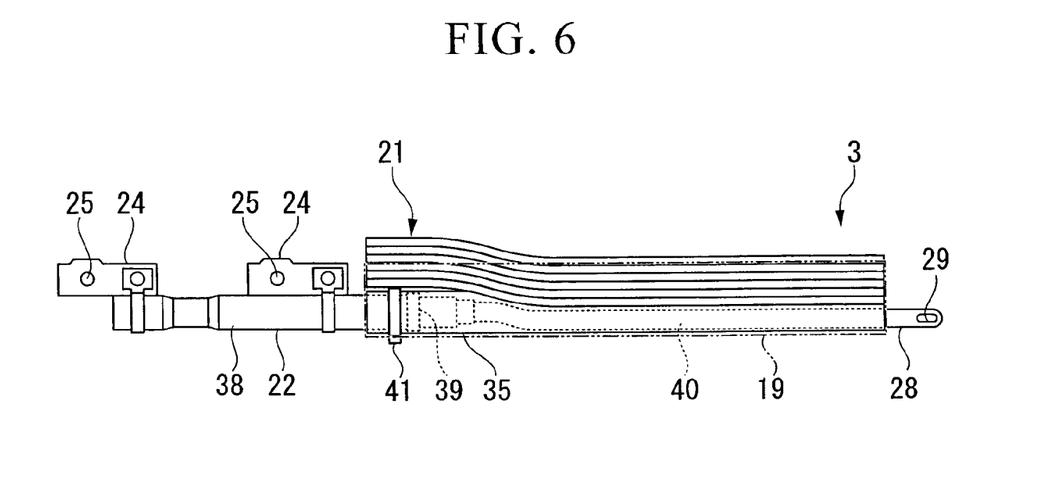
FIG. 6 is a side view showing the folded state of the air bag body in the air bag device serving as an occupant protection device according to the first embodiment of the present invention.

As shown in FIG. 6, the air bag body 21 is folded so as to be successively piled upward and, in a state aligned with the longitudinal direction of the vehicle, is placed in the door 10. Then, the air bag body 21 expands upward by the gas generated by the inflator 22 and, as shown in FIG. 3, deploys so as to cover the inside surface of the window glass 12 of the window 15 while opening the opening portion 16 of the door lining 14. As shown in FIG. 4, the air bag body 21 has cells 43 serving as expansion portions that expand during deployment and non-expansion portions 44 that do not expand. The cells 43 are portions that inflate in a cylindrical shape so as to extend in the vertical direction, with a plurality being provided side-by-side in the vehicle longitudinal direction. The non-expansion portions 44 are portions that do not inflate, and formed by joining of the base fabrics 33 and 34 by sewing, adhesion or weaving such as jacquard weaving. Since these non-expansion portions 44 are formed at positions between the cells 43, the air bag body 21 as a whole inflates in a plate shape.

Figure 7:
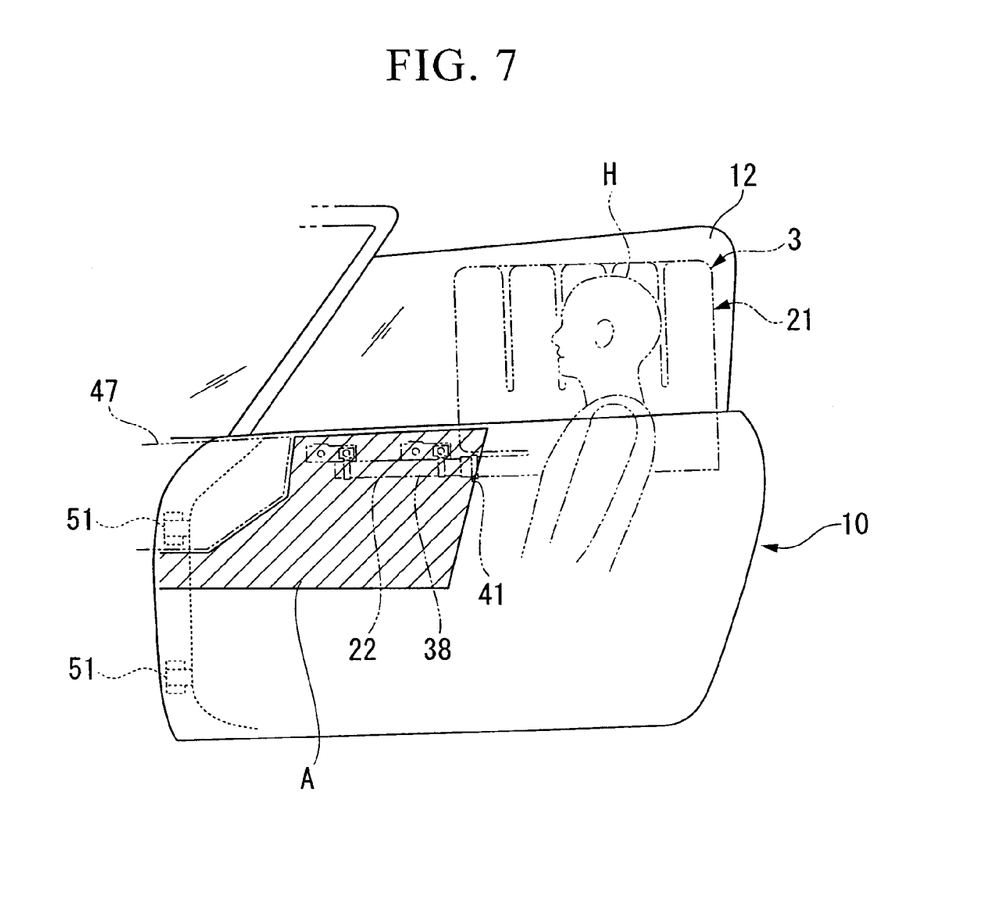
FIG. 7 is a side view showing in outline form the disposal of the air bag device as an occupant protection device according to the first embodiment of the present invention.

When placing the air bag device 3 in the door 10, the inflator 22 is disposed at a position that satisfies predetermined conditions. The placement position that satisfies these conditions is explained below. First, as shown in FIG. 7, the inflator 22 is disposed within the range of the upper half portion of the door 10. Second, in the longitudinal direction of the vehicle, it is disposed at a position excluding the portion to the side of where the occupant would normally sit. Specifically, when a seat 46 (shown in FIG. 1) that is adjacent to the door 10 is slid to the forwardmost position, the inflator 22 is at a position forward of the occupant H seated in the seat 46. Third, the inflator 22 is disposed at a position that does not interfere with an instrument panel 47 or reinforcing members and the like (not illustrated) that connect lateral pillars on the vehicle body side, specifically, within a range of the front half portion of the door 10 in the longitudinal direction of the vehicle.

A region A shown by hatching in FIG. 7 is an example of a placement position of the inflator 22 that satisfies these conditions. Thereby, the inflator 22 is provided at the front half portion of the door 10 in the longitudinal direction of the vehicle, that is, at a hinge 51 that is a mounting portion of the door 10 to the vehicle body 2.

When the deployment condition of the air bag device 3 described above is met during a vehicle collision, such as a G-force equal to or greater than a predetermined amount being detected, the inflator 22 ignites. Then the folded-up air bag body 21 inflates by the gas generated by the inflator 22. Since the air bag body 21 is folded in a manner to be successively overlapped upward, it opens the opening portion 16 in the door lining 14 and deploys upward so as to cover the rear portion to middle portion of the window glass 12 in the longitudinal direction of the vehicle, as shown by the dashed-two dotted line in FIG. 3.

As described above, according to the air bag device 3 of the present embodiment, the inflator 22 is provided near the hinge 51, which is the mounting portion of the door 10 to the vehicle body 2. For this reason, it is possible to shift the position of the inflator 22 with respect to the occupant H. As a result, the inflator 22 need not be covered by a reaction plate, and the guide pipe 40, which has a smaller diameter than the inflator 22, may be covered by the reaction plate 19. Therefore, since it is possible to ensure the impact absorption margin (stroke), a simple reaction plate 19 can be used instead of a high-efficiency impact absorption structure. As a result, it is possible to simplify the structure.

Also, the end portion of the inflator 22 at which the gas delivery port 39 is formed is directly inserted in the fabric air bag body 21. For that reason, it is possible to directly feed gas from the inflator 22 to the air bag body 21 at the time of a vehicle collision. As a result, outgassing of gas can be prevented.

Figure 8:
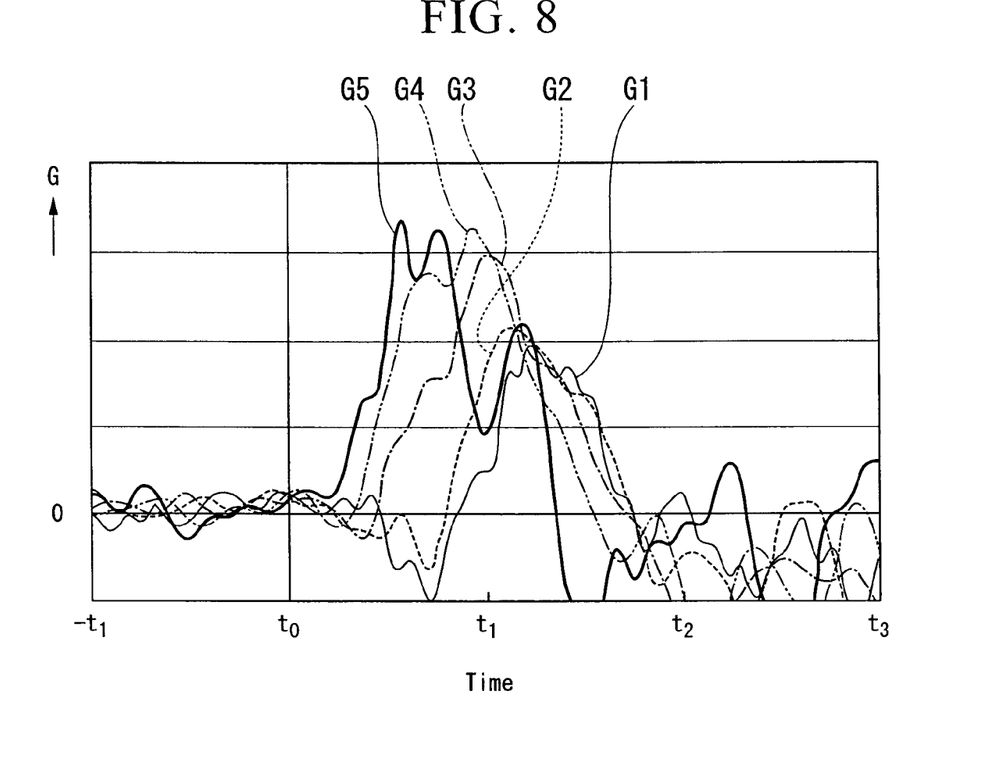
FIG. 8 is a characteristic line graph showing the acceleration that occurs during opening and closing of the door.

Moreover, providing the inflator 22 on the hinge 51 side that is the mounting portion of the door 10 to the vehicle body 2 can minimize the input force to the inflator 22 that occurs by opening and closing of the door 10. Here, FIG. 8 shows the characteristics of acceleration that occurs during opening and closing of the door. The graph shows the characteristics of acceleration as measured at five measurement points in the door 10, the measurement points being nearly equally spaced from the side near the hinge 51 to the far side in the horizontal direction (longitudinal direction of the vehicle). That is, in the order from the side of the door 10 near the hinge 51, the graph shows a thin solid line G1, a dashed line G2, a dashed-one dotted line G3, a dashed-two dotted line G4, and a thick solid line G5. It is apparent front the graph that the further away in the door 10 from the hinge 51, the greater the acceleration produced during opening and closing. However, since the inflator 22 is provided on the side of the hinge 51, which is the mounting portion of the door 10 to the vehicle body 2, that is, at a position in the vicinity of the hinge 51, it is possible to minimize the input force to the inflator 22 during opening and closing of the door 10.

In addition, since the inflator 22 is provided between the upper portion and the middle portion of the door 10 in the vertical direction, that is, in a portion other than the lower portion, it is possible to minimize effects acting on the inflator 22 during a side impact by another vehicle. In other words, since the lower portion of the door 10 receives the input force from a collision object (such as the bumper of the other vehicle) during a vehicle collision, by providing the inflator 22 between the upper portion and middle portion of the door 10, it is possible to minimize the effects acting on the inflator 22 during a side impact by another vehicle.

Moreover, the inflator 22 is disposed partially overlapping the air bag body 21 in the vertical direction. For this reason, the overall length of the air bag device 3 in the longitudinal direction of the vehicle can be made compact, thus allowing an increase in the storability while enabling the length of the guide pipe 40 that is disposed in the air bag body 21 to be shortened.

Figure 9:
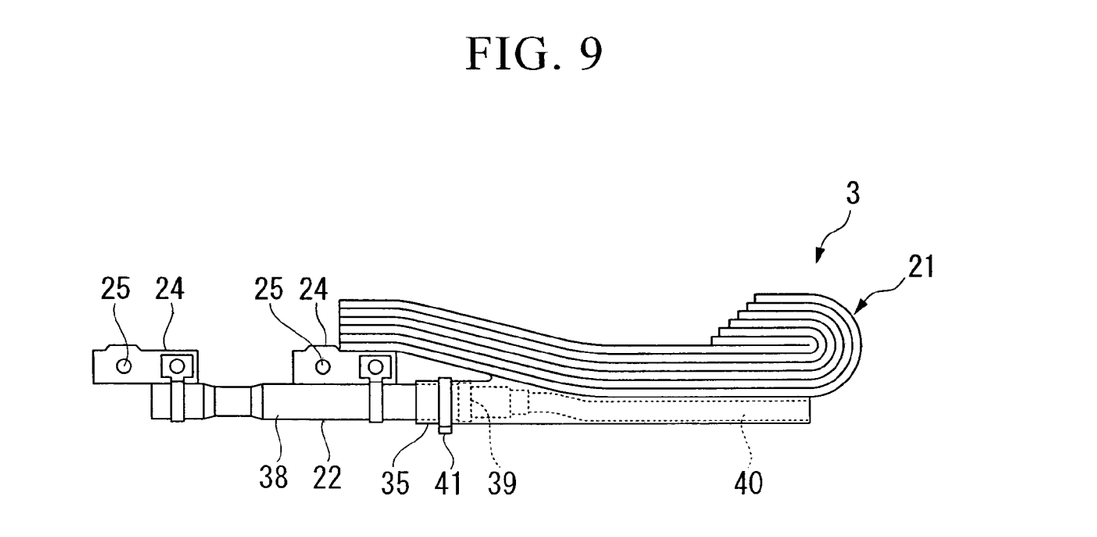
FIG. 9 is a side view that shows a modification example of the air bag device as an occupant protection device according to the first embodiment of the present invention.

In order to make the air bag device 3 described above even more compact to increase storability, as shown in FIG. 9, the portion of the air bag body 21 on the opposite side of the inflator 22 (opposite end portion side) may be folded toward the side of the inflator 22. In addition, as shown in the drawing, the portion of the air bag body 21 on the inflator 22 side above the mounting opening portion 35 may be made to wrap the side of the inflator 22 beyond the mounting opening portion 35.

SECOND EMBODIMENT

A second embodiment of the occupant protection device according to the present invention shall next be described below with reference to FIGS. 10 to 14B.

Figure 10:
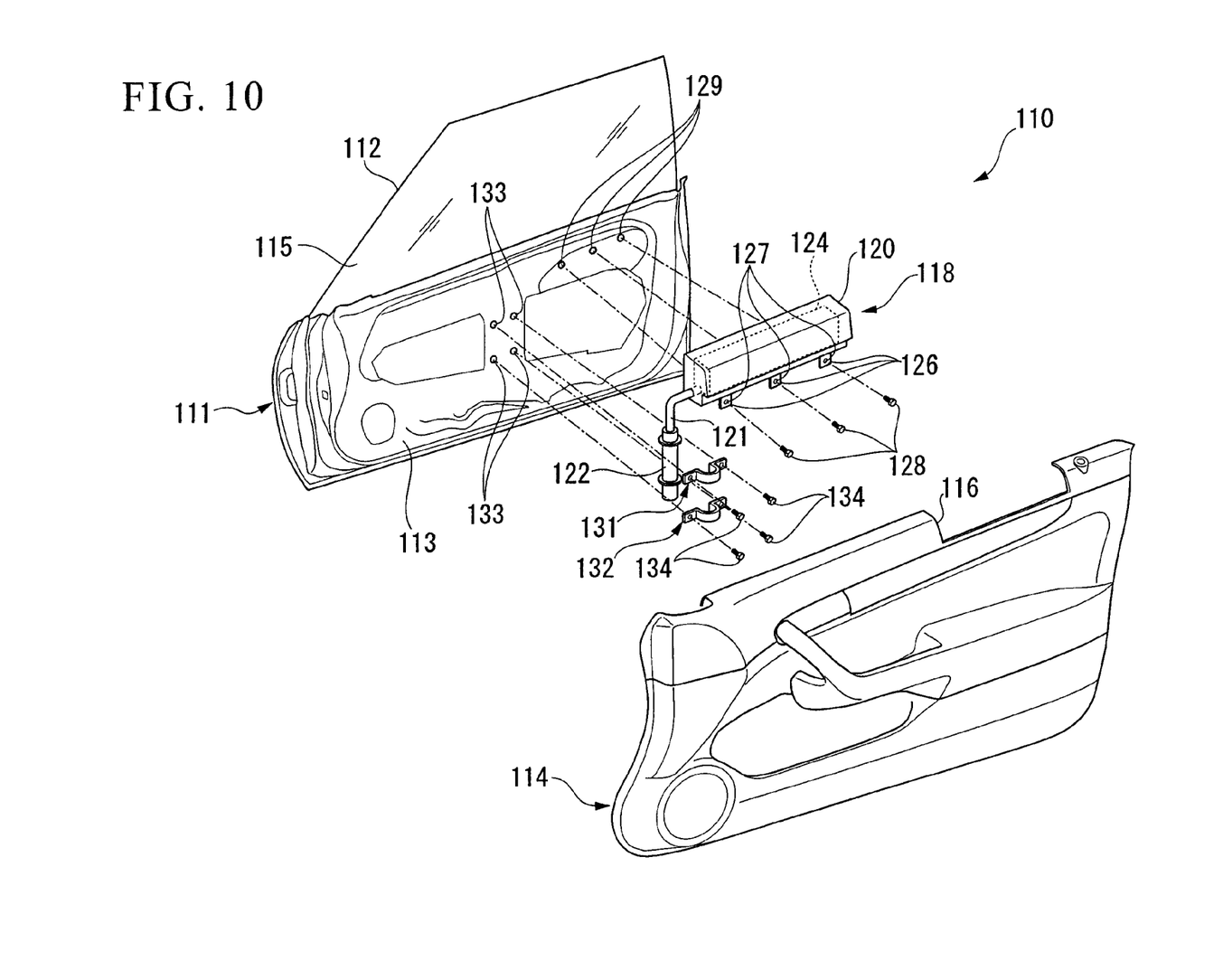
FIG. 10 is an exploded perspective view of a door to which an air bag device serving as an occupant protection device according to the second embodiment of the present invention has been applied.
Figure 11:
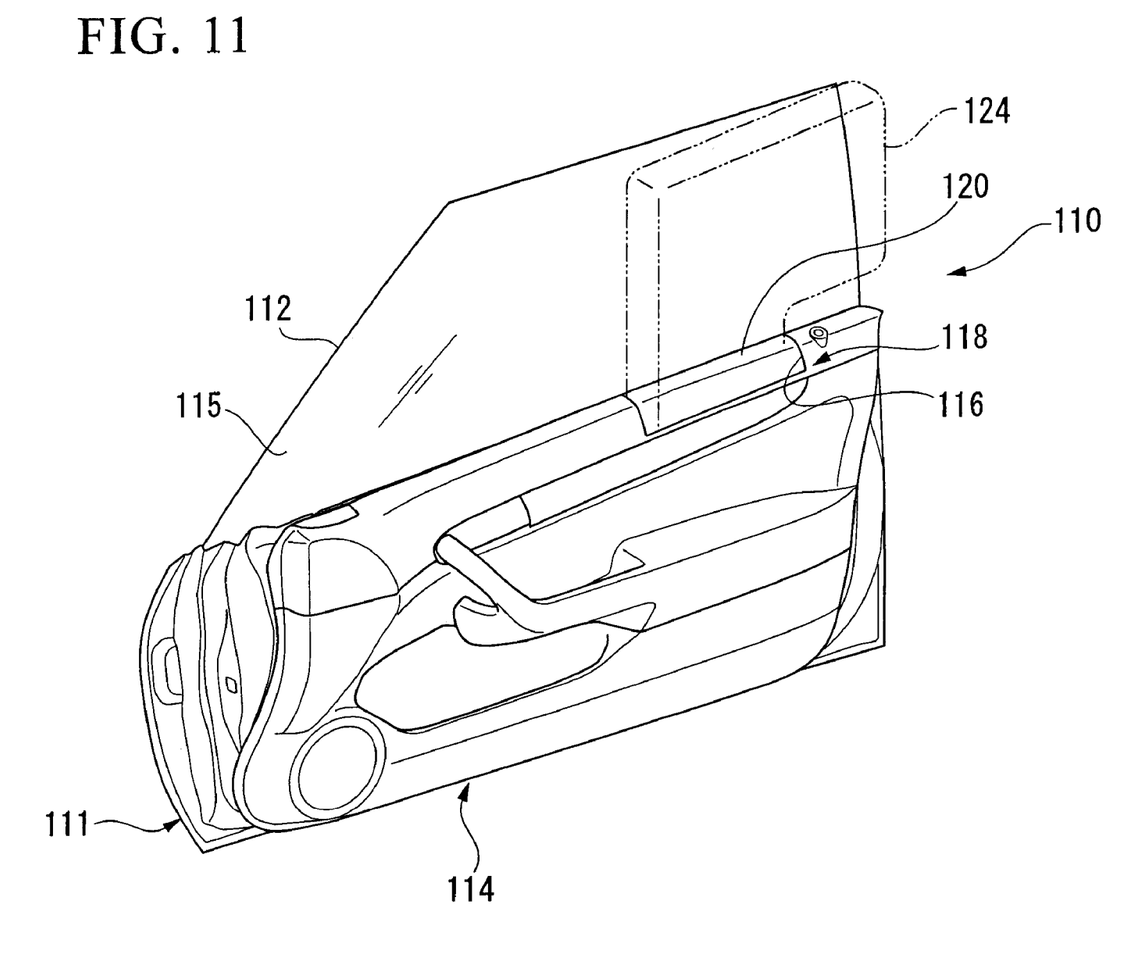
FIG. 11 is a perspective view of a door to which an air bag device serving as an occupant protection device according to the second embodiment of the present invention has been applied.

FIG. 10 is an exploded perspective view of a door 110 on the right side of a vehicle to which an air bag device 118, serving as an occupant protection device according to the present embodiment, has been provided. FIG. 11 is an assembly drawing of the same. Here, the door 110 is one that is attached to an open-roof type vehicle in which the roof is openable or detachable. Note that in the description given below, the door 110 is in a closed state.

The door 110 has a metal door body (mounted member) 111, a window glass 112 that can move up and down, and a door lining 114. The door body 111 is disposed perpendicular to the vehicle width direction. The window glass 112 extends upward along the door body 111 from within the door body 111. The door lining 114 covers the cabin interior side of an inner panel 113 that constitutes the cabin interior side of the door body 111, thus forming a design surface of the cabin interior side. The upper side of the door body 111 serves as a window 115. The window 115 is opened and closed by raising and lowering the window glass 112 that constitutes a portion thereof. The metal door body 111 is a high rigidity portion of the door 110, and constitutes a portion of the vehicle body.

The door 110, the door body 111, the window glass 112, the inner panel 113, the door lining 114, and the window 115 have the same basic structures as the door 10, the door body 11, the window glass 12, the inner panel 13, the door lining 14, and the window 15, respectively.

A cutaway portion 116 that has a rectangular shape in a plan view and side view is formed in a predetermined range in the rear portion, in the longitudinal direction, of the upper edge portion of the door lining 114. The air bag device 118 is disposed so that a portion thereof fits into this cutaway portion 116.

The air bag device 118 has a case 120, a pipe 121, and an inflator 122. The case 120 has a shape that is horizontally long so as to be able to fit in the cutaway portion 116 of the door lining 114. The pipe 121 has a shape that extends laterally from the lower portion of the case 120 (specifically, toward the front in the longitudinal direction of the vehicle) and bends downward midway. The inflator 122 has a cylindrical shape and is connected to the end of the pipe 121 opposite to the case 120.

An air bag body (expanding body) 124 that expands during a vehicle collision is housed in the case 120. The air bag body 124 is folded so as to be successively piled upward and, in a horizontally long state aligned with the longitudinal direction of the vehicle, is placed in the case 120. The air bag body 124 expands upward by gas that is fed from the inflator 122, which is filled with a propellant that generates high pressure gas (fluid) by combustion, via the pipe 121 that is fitted to the bottom portion thereof. As described above, the inflator 122 that sends gas for inflation to the air bag body 124 is disposed to the side of the air bag body 124 (specifically, to the front in the longitudinal direction of the vehicle).

Here, the inflator 122 has an overall long and cylindrical shape and is connected to the pipe 121 in an orientation along the vertical direction. Here, the angle of the inflator 122 to the horizontal direction is set to a range of 45 degrees to 90 degrees depending on the layout. In the example that is illustrated, the angle is set to 90 degrees, that is, vertical.

The air bag device 118 is fixed to the inner panel 113. Specifically, a plurality of mounting pieces 126 are formed on the lower portion of the case 120, and bolts 128 that are inserted in insertion holes 127 formed in each of the mounting pieces 126 are screwed into mounting holes 129 of the inner panel 113. Thereby, the case 120 is fixed approximately horizontally to the inner panel 113. Also, the inflator 122 is mounted by bolts 134 to mounting holes 133 of the inner panel 113 via mounting members 131 and 132 at two positions in an upper and lower configuration, respectively.

Figure 12:
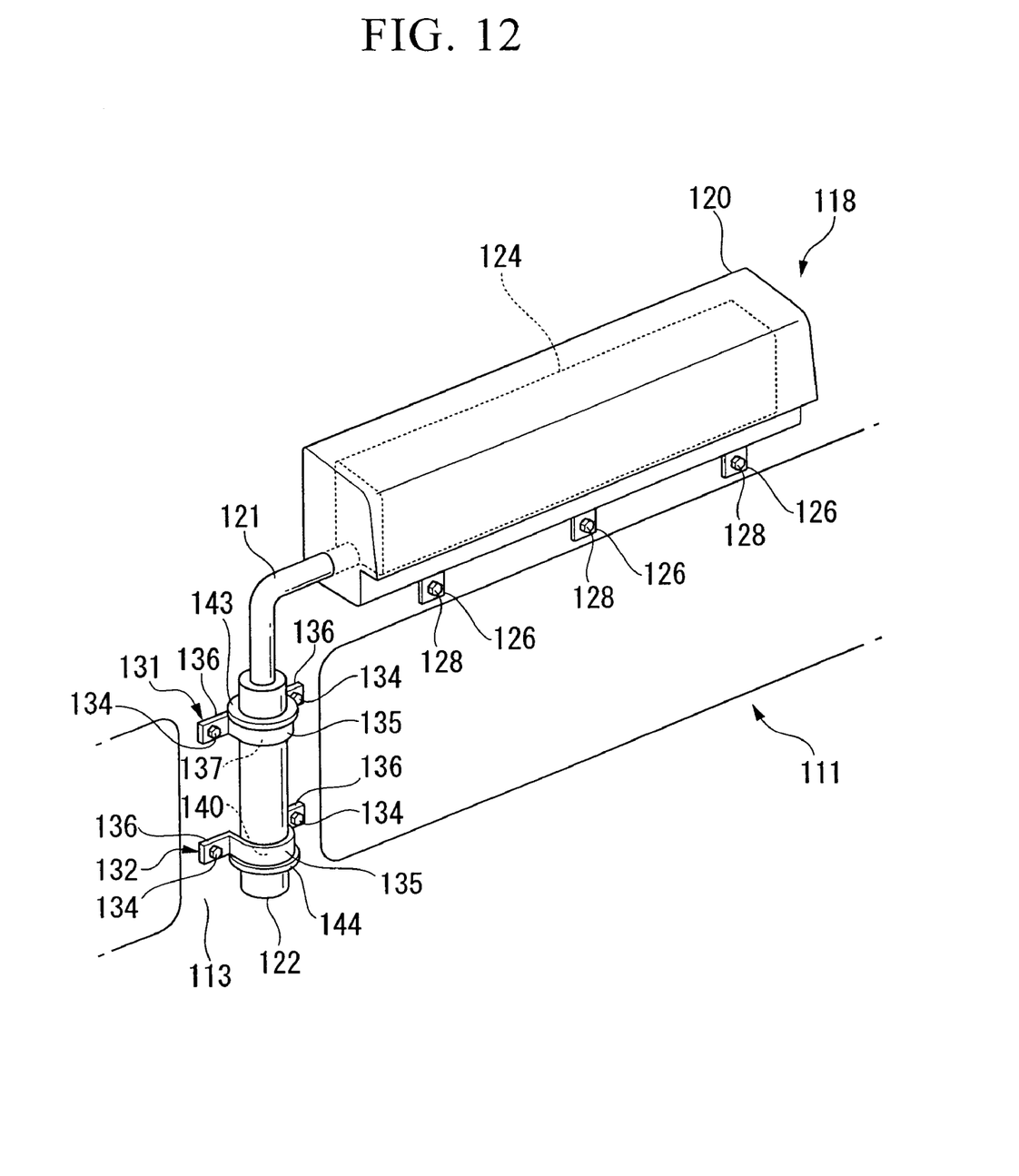
FIG. 12 is a perspective view of an air bag device serving as an occupant protection device according to the second embodiment of the present invention.
Figure 13:
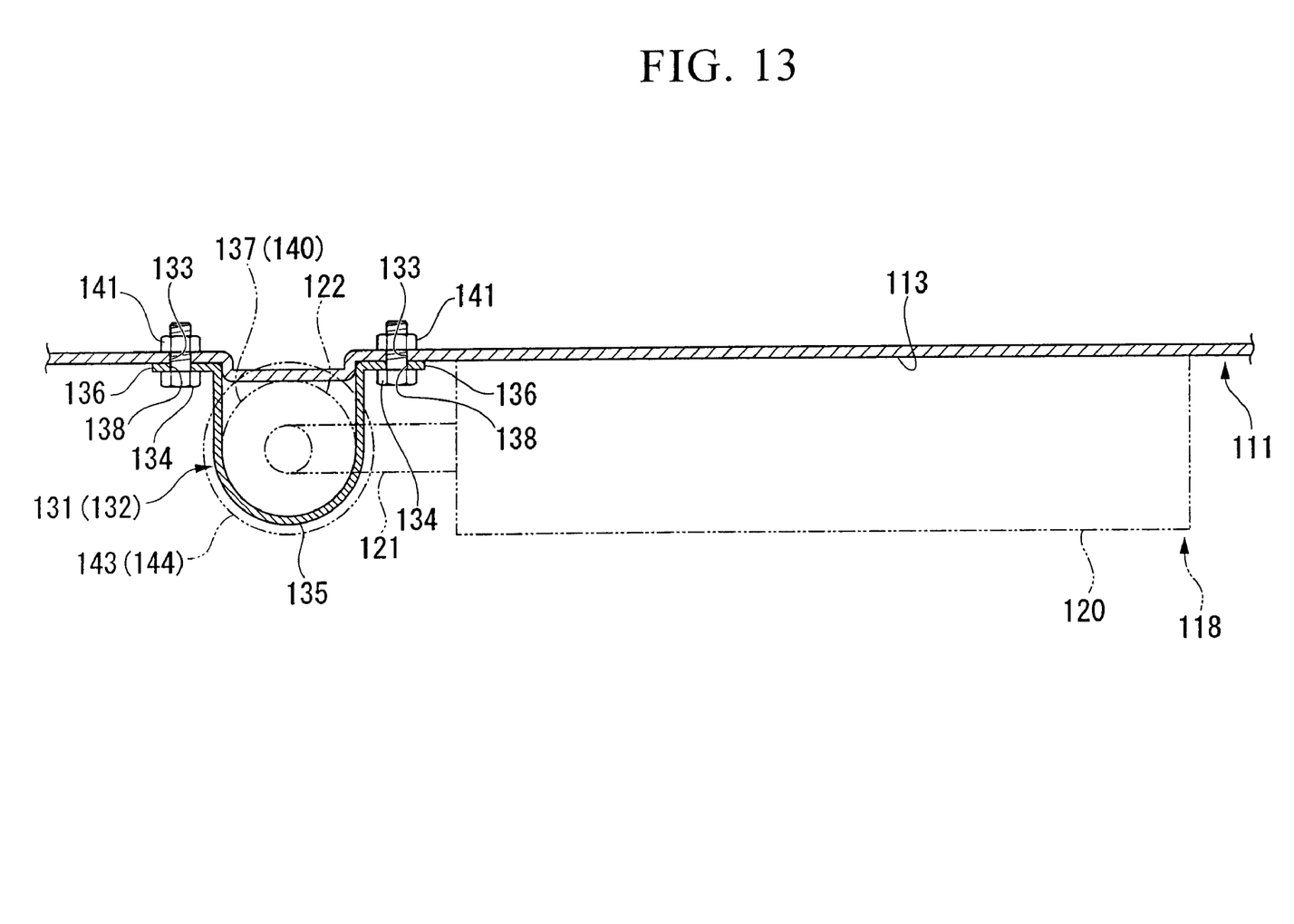
FIG. 13 is a plane sectional view showing the air bag device serving as an occupant protection device according to the second embodiment of the present invention.

These mounting members 131 and 132 each have a shape in which flat mounting plate portions 136 are formed at both ends of an arch-shaped retaining portion 135, as shown in detail in FIG. 12 and FIG. 13. An insertion hole 138 is formed in each mounting plate portion 136. The retaining portion 135 of the upper side mounting member 131 is hung on a cylindrical mounting portion 137 at the upper portion of the inflator 122. In this state, the bolts 134 that are inserted in the insertion holes 138 of the mounting plate portions 136 are screwed into weld nuts 141 that are fixed to the underside of the corresponding mounting holes 133 in the inner panel 113 and thereby mounted to the inner panel 113. The retaining portion 135 of the lower side mounting member 132 is hung on a cylindrical mounting portion 140 at the lower portion of the inflator 122. In this state, the bolts 134 that are inserted in the insertion holes 138 of the mounting plate portions 136 are screwed into weld nuts 141 that are fixed to the underside of the corresponding mounting holes 133 in the inner panel 113 and thereby mounted to the inner panel 113. Thus the inflator 122 is attached to the inner panel 113 by the mounting members 131 and 132.

In the inflator 122, a flange portion 143 is formed on the upper side of the mounting portion 137 on the upper side, and a flange portion 144 is formed on the lower side of the mounting portion 140 on the lower side. The mounting member 131 on the upper side engages with the bottom surface of the flange portion 143 at the upper portion, and the mounting member 132 on the lower side engages with the top surface of the flange portion 144 at the lower portion. Thereby, the inflator 122 is attached to the inner panel 113. Here, the mounting members 131 and 132 are attached to the inner panel 113 by the mounting plate portions 136 provided on both sides of the retaining portion 135 while retaining the cylindrical mounting portions 137 and 140, respectively, of the inflator 122 by the arch-shaped retaining portion 135. For this reason, the inflator 122 is rotatable with respect to the mounting members 131 and 132. That is, the inflator 122 is attached to the inner panel 113 to be rotatable about its central axis, that is, about an axis along the vertical direction. Note that since the inflator 122 is connected to the case 120 by the pipe 121, in an ordinary state the inflator 122 does not rotate. Also, since the mounting member 131 on the upper side engages with the bottom surface of the flange portion 143 at the upper portion, and the mounting member 132 on the lower side engages with the top surface of the flange portion 144 at the lower portion, movement of the inflator 122 in the vertical direction with respect to the inner panel 113 is regulated by these mounting members 131 and 132.

The air bag body 124 is folded so as to be successively piled upward with respect to the connection portion with the pipe 121, and therefore basically deploys upward when deploying by the gas generated by the inflator 122. Here, as shown in FIG. 11, the air bag body 124 deploys in an overall plate shape that is long in the longitudinal direction of the vehicle when inflated.

When the deployment condition of the air bag device 118 described above is met during a vehicle collision, such as a G-force equal to or greater than a predetermined amount being detected, the inflator 122 ignites. Then the folded-up air bag body 124 inflates by the gas generated by the inflator 122. Since the air bag body 124 is folded in a manner to be successively overlapped upward, it opens the case 120 and deploys upward so as to cover the inside surface of the window glass 112, as shown by the dashed-two dotted line in FIG. 11.

As described above, according to the air bag device 118 of the present embodiment, the inflator 122 is mounted on the inner panel 113 of the door 110 on the vehicle body side to be rotatable about an axis along the vertical direction. For that reason, even when the inner panel 113 deforms during a vehicle collision to produce with respect to the inflator 122 an input force is capable of generating relative rotation with the air bag body 124 via the inner panel 113, the inflator 122 rotates about an axis along the vertical direction with respect to the inner panel 113. As a result, it is possible to control relative rotation of the inflator 122 with respect to the air bag body 124.

Figure 14A:
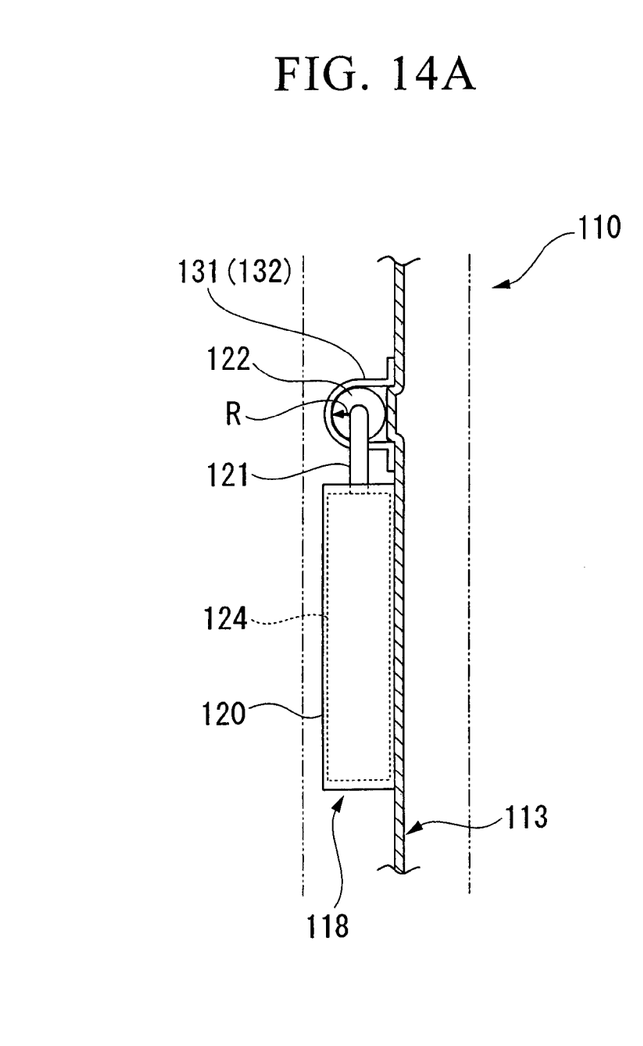
FIG. 14A is a plan view showing in outline form, prior to a vehicle collision, the air bag device serving as an occupant protection device according to the second embodiment of the present invention.
Figure 14B:
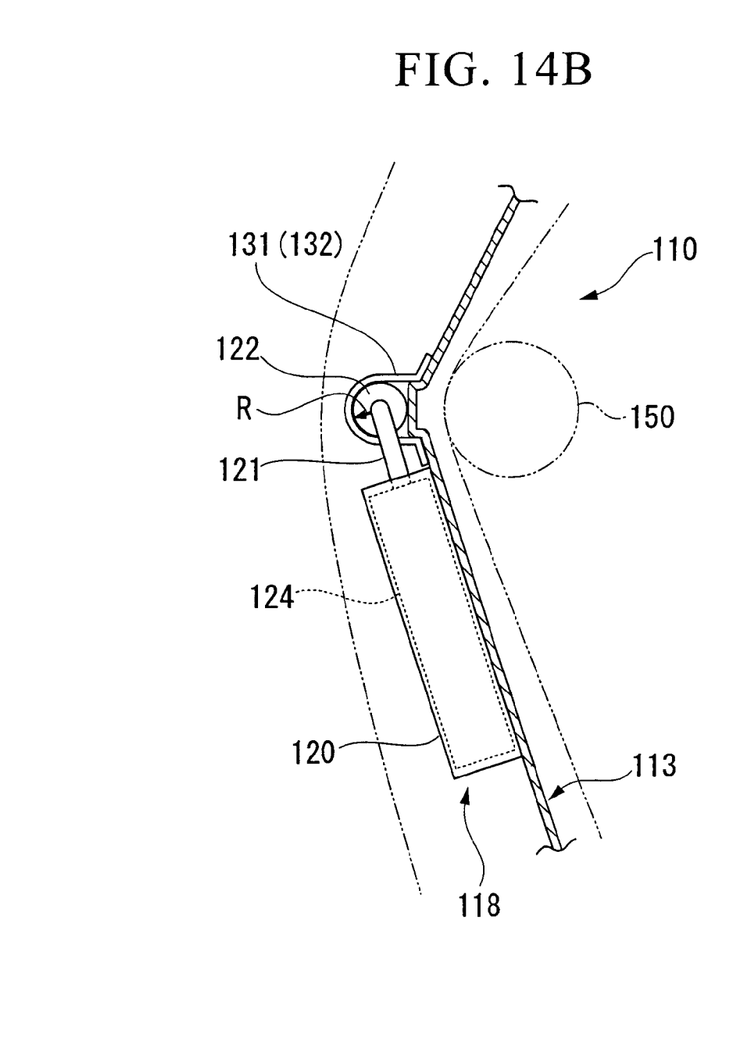
FIG. 14B is a plan view showing in outline form, after a vehicle collision, the air bag device serving as an occupant protection device according to the second embodiment of the present invention.

For example, in contrast to the ordinary state shown in FIG. 14A, FIG. 14B shows the state when a local deformation is produced in the inner panel 113 as a result of a collision object 150 such as a utility pole or tree that is long in the vertical direction impacting from the side. Even when such a deformation occurs, the inflator 122 rotates about an axis along the vertical direction with respect to the inner panel 113. Thereby, it is possible to control relative rotation of the inflator 122 with respect to the air bag body 124 and the case 120. In FIG. 14A and FIG. 14B, a position of the inflator 122 serving as a reference is shown by an arrow R. From these drawings, it is evident that the inflator 122 rotates with respect to the inner panel 113. In other words, it is possible to control the rotation of the inflator 122 with respect to the air bag body 124 and the case 120 at the time of deformation. Accordingly, it is possible to suppress damage that occurs during a vehicle collision even with an air bag device 118 that disposes the inflator 122 to the front with respect to the air bag body 124.

Also, since the long inflator 122 is mounted along the vertical direction, the overall length of the air bag device 118 in the longitudinal direction can be shortened. This point also can hinder the air bag device 118 from being affected by deformation of the inner panel 113 during a vehicle collision, and so can suppress damage that occurs during a vehicle collision.

Moreover, the mounting members 131 and 132 for attaching the inflator 122 to the inner panel 113 regulate movement in the vertical direction of the inflator 122 with respect to the inner panel 113. For this reason, there is no need to separately provide a vertical movement restriction member, enabling simplification of the structure and a reduction in costs.

Explanations were given in the aforementioned embodiments using as examples the air bag device 118 provided in the door 110 of the vehicle. However, the present invention is not limited thereto. It can be applied to any air bag device provided it is one having its inflator disposed to the front with respect to the air bag. For example, it may be applied to an air bag device that is provided below a rear side window in a coupe-type vehicle and applied to an air bag device that is provided below a tailgate window.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An occupant protection device that is provided in a door on a side of a vehicle, comprising:
    an inflator that has an end portion at which a fluid delivery port is formed and delivers a fluid during a vehicle collision; and
    an expending body that expends by the fluid fed by the inflator to cover an inside surface of a window provided in the door;
    wherein the end portion of the inflator is directly inserted in the expanding body,
    wherein the inflator is provided on a side of the door to be mounted to a vehicle body, in a longitudinal direction of the vehicle, and
    wherein the inflator is disposed in a side area of the expanding body and mounted on a mounted member provided on the door so as to be rotatable about an axis that extends in the vertical direction.

2. The occupant protection device according to claim 1, wherein the inflator is mounted on the mounted member by mounting members that restrict movement of the inflator in the vertical direction with respect to the mounted member.

3. The occupant protection device according to claim 1, wherein the expanding body is housed in a case and the case has a shape that is horizontally long so as to be able to fit in a cutaway portion of the lining of the door.

4. The occupant protection device according to claim 2, wherein the inflator includes first and second flange portions that interfere with said mounting members in order to prevent vertical movement of the inflator.

5. An occupant protection device that is provided in a door on a side of a vehicle, comprising:
    an inflator that has an end portion at which a fluid delivery port is formed and delivers a fluid during a vehicle collision; and
    an expanding body that expands by the fluid fed by the inflator to cover an inside surface of a window provided in the door; wherein the inflator is provided on a side of the door to be mounted to a vehicle body in a longitudinal direction of the vehicle;

the expanding body is provided with a cell and a mounting opening portion which are vertically arranged so as to be separated by a cut-in portion, the cut-in portion being arranged at a predetermined distance above the lower end edge of the expanding body, on said side of the door;

the end portion of the inflator is directly inserted into the mounting opening portion of the expanding body; and the end portion of the inflator and the cell of the expanding body are vertically superposed on each other across the cut-in portion.

* * * * *